Patented Sept. 27, 1938

2,131,206

UNITED STATES PATENT OFFICE 2,131,206

PRESERVATION OF RUBBER

Ira Williams, Woodstown, N. J., and Arthur Morrill Neal, Wilmington, Del., assignors to E. I. du Pont de Nemours & Company, Wilmington, Del., a corporation of Delaware No Drawing. Application March 28, 1934,
Serial No. 717,796

4 Claims. (Cl. 18—50)

This invention relates to the preservation of rubber and more particularly to the treatment of rubber with compounds which retard that deterioration which rubber normally undergoes when exposed to the action of heat, light and oxygen.

It is well known that many compounds possess the property, when incorporated in rubber, of retarding that deterioration which rubber normally undergoes when exposed to the action of light, heat and oxygen. Among the compounds which have been proposed and successfully employed as deterioration inhibitors in rubber are the secondary aromatic amines such as phenyl-b-naphthyl-amine. While these compounds are active deterioration inhibitors, they can not be successfully employed in white or light colored rubber stocks because rubber stocks containing them become badly discolored when exposed to the action of sunlight.

An object of the present invention is to provide a new class of compounds which are effective inhibitors of that deterioration which rubber normally undergoes due to the action of light, heat, and oxygen. A further object is to provide a class of compounds which may be added to white or light colored rubber without producing bad discoloration when the rubber containing them is exposed to the action of sunlight. A still further object is to provide rubber compositions having improved properties, particularly unusual resistance to discoloration and deterioration when exposed to the action of light, heat and oxygen. Other objects are to provide new compositions of matter and to advance the art. Still other objects will appear hereinafter.

These objects may be accomplished in accordance with our invention which comprises incorporating in rubber a compound of the type:

in which R represents an ar.-tetra-hydro-naphthyl nucleus and R' represents an aryl, aralkyl or alkyl nucleus. When these compounds are incorporated into rubber the resistance of the rubber to deterioration due to the action of light, heat and oxygen is greatly increased. Furthermore, when these compounds are incorporated in light and white colored rubber, such rubber may be exposed to the sunlight for appreciable periods of time without producing bad discoloration. Further, rubber containing these compounds is unusually resistant to that failure usually caused by flexing.

When the term "nucleus" is employed in this specification and throughout the claims, it will be understood that the group referred to may contain hydroxy, alkoxy, amino and like groups. The term "radical" as employed in this specification and throughout the claims will be understood to mean that the indicated group is a hydrocarbon group, in other words, consists of carbon and hydrogen, solely. The term "alkyl" will be understood to include unsaturated groups such as crotyl, allyl, vinyl, etc., as well as the saturated groups.

Among the compounds which we have found to be particularly satisfactory for our purpose are:

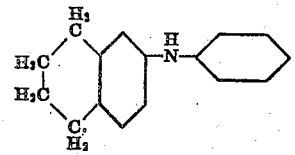

ar.-tetra-hydro-b-naphthyl-phenyl amine.

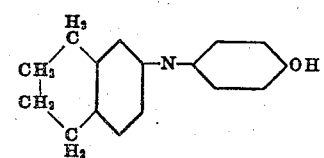

ar.-tetra-hydro-b-naphthyl-p(OH)-phenyl amine.

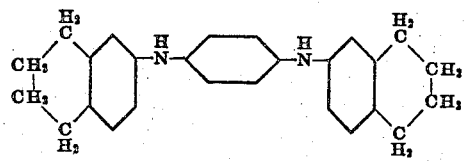

N-N'-di-ar.-tetra-hydro-b-naphthyl-p-phenylene diamine.

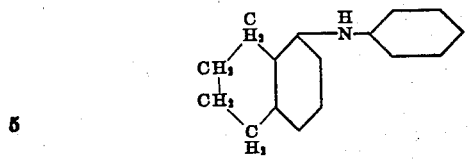

ar.-tetra-hydro-a-naphthyl-phenyl amine.

In order to test these compounds the following stocks were prepared in which the numbers indicate parts by weight.

| | A | B | C | D | E |
|---|---|---|---|---|---|
| Pale crepe | 100 | 100 | 100 | 100 | 100 |
| Zinc oxide | 100 | 100 | 100 | 100 | 100 |
| Lithopone | 20 | 20 | 20 | 20 | 20 |
| Stearic acid | 1 | 1 | 1 | 1 | 1 |
| Sulfur | 3 | 3 | 3 | 3 | 3 |
| Di-ortho-tolyl-guanidine | 0.75 | 0.75 | 0.75 | 0.75 | 0.75 |
| Ar.-tetra-hydro-b-naphthyl-phenylamine | | 1 | | | |
| Ar.-tetra-hydro-a-naphthyl-phenylamine | | | 1 | | |
| Ar.-tetra-hydro-b-naphthyl-p(OH)-phenyl amine | | | | 1 | |
| N-N'-di-ar.-tetra-hydro-b-naphthyl-p-phenylene diamine | | | | | 1 |

These stocks were vulcanized for 45 minutes at 40 pounds steam pressure. Accelerated aging tests were carried out by hanging the vulcanized slabs in the Bierer Davis bomb in which a constant temperature of 70° C. and a pressure of 300 pounds of oxygen were maintained. The results of this test are given in Table I.

Table I

| Stock | Original tensile | After 120 hours at 70° C. and 300# oxygen tensile |
|---|---|---|
| A | 3,700 | Completely deteriorated in 48 hours |
| B | 4,175 | 2,125 |
| C | 4,025 | 1,725 |
| D | 3,975 | 2,650 |
| E | 4,000 | 2,950 |

As can be seen all of these compounds are extremely effective in overcoming that deterioration which is due to heat and oxidation. Furthermore, when these white stocks containing ar.-tetra-hydro-b-naphthyl-phenyl-amine or ar.-tetra-hydro-a-naphthyl-phenyl-amine are exposed to sunlight there is practically no discoloration produced. Thus it is shown that these deterioration inhibitors are suitable for use in either white or light colored stocks.

In order to test these compounds further the following stocks were prepared in which the indicated amounts represent parts by weight.

| | A | B | C | D |
|---|---|---|---|---|
| Smoked sheets | 100 | 100 | 100 | 100 |
| Zinc oxide | 5 | 5 | 5 | 5 |
| Carbon black | 40 | 40 | 40 | 40 |
| Stearic acid | 2 | 2 | 2 | 2 |
| Sulfur | 3 | 3 | 3 | 3 |
| Pine tar | 3 | 3 | 3 | 3 |
| Mercapto-benzo-thiazole | 1.25 | 1.25 | 1.25 | 1.25 |
| Ar.-tetra-hydro-b-naphthyl-phenyl-amine | | 1.25 | | |
| Ar.-tetra-hydro-a-naphthyl-phenyl-amine | | | 1.25 | |
| N-N'-di-ar.-tetra-hydro-b-naphthyl-p-phenylene-diamine | | | | 1.25 |

These stocks were vulcanized for 45 minutes at 40 pounds and were then tested for their resistance to flexing. These tests were made on the machine and by the method described in an article in Rubber Age, Vol. 26, page 542 (1930). Failure was shown in this test by the appearance of deep nicks and cracks in the test pieces. The results of this flexing test are given in Table II.

Table II

| Stock | Hours for failure |
|---|---|
| A | 48 |
| B | >168 |
| C | >168 |
| D | 120 |

It can be seen from these results that these compounds are not only effective in overcoming that deterioration which is due to heat and oxidation but are also very effective in overcoming that failure which is due to flexing.

The ar.-tetra-hydro-naphthyl nucleus and the aryl nuclei may contain alkoxy substituents as in the following compounds.

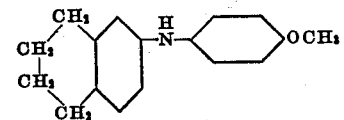

p-Methoxy phenyl-ar.-tetrahydro-b-naphthylamine.

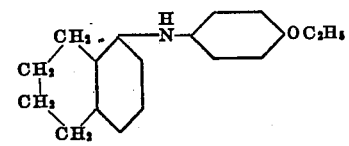

p-Ethoxy-phenyl-ar.-tetra-hydro-a-naphthylamine.

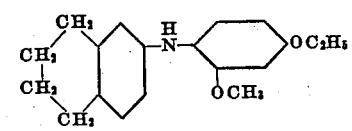

p-Ethoxy-m-methoxy-phenyl-ar.-tetra-hydro-b-naphthylamine.

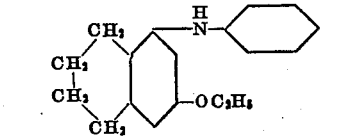

1-phenyl-amino-3-ethoxy-ar.-tetra-hydro-naphthalene.

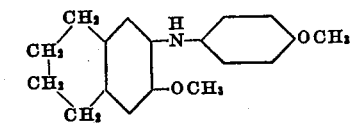

2-p-anisyl-amino-3-methoxy-ar.-tetra-hydro-naphthalene.

The ar.-tetra-hydro-naphthalene and aryl groups may also contain alkyl substituents as in the following compounds:

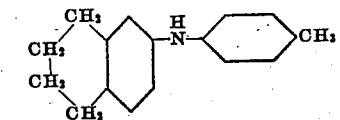

p-Tolyl-ar.-tetra-hydro-b-naphthylamine.

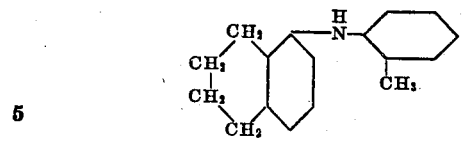
o-Tolyl-ar.-tetra-hydro-a-naphthylamine.

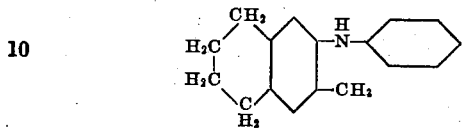
2-Phenyl-amino-3-methyl-ar.-tetra-hydro-naphthalene.

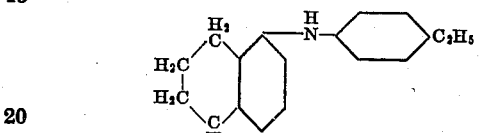
p-Ethyl-phenyl-ar.-tetra-hydro-a-naphthylamine.

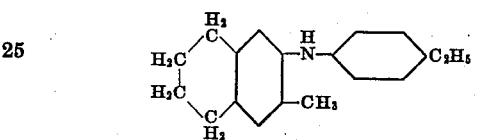
2-p-Ethyl-phenyl-amino-3-methyl-ar.-tetra-hydro-naphthalene.

Further, the ar.-tetra-hydro-naphthalene and aryl groups may contain substituted amino substituents as in

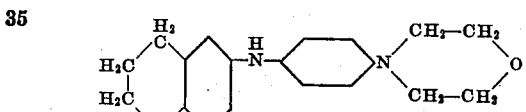
p-Morpholyl-phenyl-ar.-tetra-hydro-b-naphthylamine.

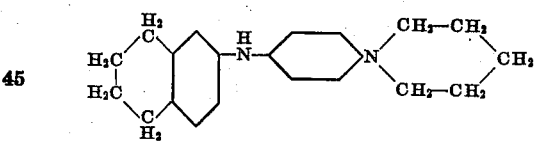
p-Piperidyl-phenyl-ar.-tetra-hydro-b-naphthylamine.

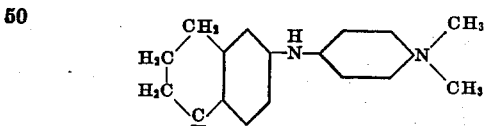
p-Dimethyl-amino-phenyl-ar.-tetra-hydro-b-naphthylamine.

Compounds in which R' represents aralkyl and alkyl substituents may be represented by the following

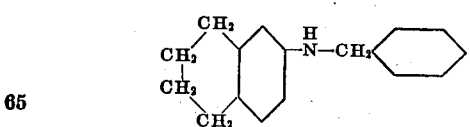
Benzyl-ar.-tetra-hydro-b-naphthylamine.

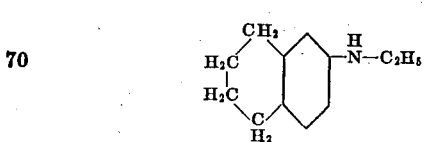
Ethyl-ar.-tetra-hydro-b-naphthylamine.

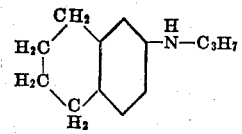
Propyl-ar.-tetra-hydro-b-naphthylamine.

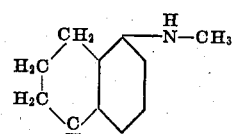
Methyl-ar.-tetra-hydro-a-naphthylamine.

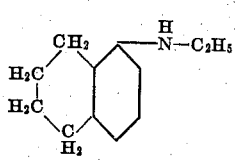
Ethyl-ar.-tetra-hydro-a-naphthylamine.

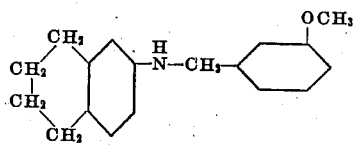
Meta-methoxyl-benzyl-ar.-tetra-hydro-B-naphthylamine.

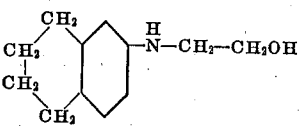
B-(OH)-ethyl-ar.-tetra-hydro-B-naphthylamine.

Compounds in which R' represents other aryl nuclei than phenyl may be illustrated by the following compounds

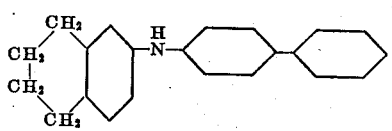
Xenyl-ar.-tetra-hydro-B-naphthylamine.

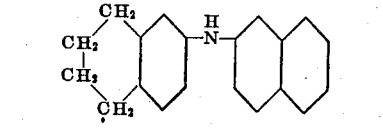
B-naphthyl-ar.-tetra-hydro-B-naphthylamine.

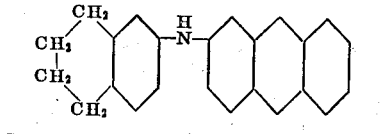
B-anthryl-ar.-tetra-hydro-B-naphthylamine.

The compounds disclosed in the examples and those mentioned above are merely illustrative of the compounds of our class. It will be understood that the various homologues and analogues of the compounds specifically disclosed may also be employed. Also, when R' represents aralkyl and alkyl nuclei such nuclei may contain amino, hydroxy and alkoxy groups.

Our compounds will generally be incorporated in rubber by milling them into the rubber prior to vulcanization. However, they can be incorporated into the rubber either before or after vulcanization by means of any of the well known methods of impregnation. Also, the amounts added may be varied within an extremely wide range depending upon the composition of the rubber stock and the desire of the user.

While we have disclosed the preferred embodiments of our invention, it will be readily apparent to those skilled in the art that many variations and modifications may be made therein without departing from the spirit thereof. Accordingly, the scope of our invention is to be limited solely by the appended claims construed as broadly as is permissible in view of the prior art.

We claim:

1. The method of preserving rubber which comprises incorporating therein a secondary N-aromatic ar.-tetra-hydro-naphthylamine in which the aromatic group contains a substituent selected from the group of hydroxy, alkoxy and amino groups said aromatic group being otherwise free of substituents other than hydrocarbon substituents.

2. The method of preserving rubber which comprises incorporating therein a secondary N-aromatic ar.-tetra-hydro-naphthylamine in which the aromatic group is of the benzene series and contains a substituent selected from the group of hydroxy, alkoxy and amino groups said aromatic group being otherwise free of substituents other than hydrocarbon substituents.

3. Rubber having incorporated therein a secondary N-aromatic ar.-tetra-hydro-naphthylamine in which the aromatic group contains a substituent selected from the group of hydroxy, alkoxy and amino groups said aromatic group being otherwise free of substituents other than hydrocarbon substituents.

4. Rubber having incorporated therein a secondary N-aromatic ar.-tetra-hydro-naphthylamine in which the aromatic group is of the benzene series and contains a substituent selected from the group of hydroxy, alkoxy and amino groups said aromatic group being otherwise free of substituents other than hydrocarbon substituents.

IRA WILLIAMS.
ARTHUR MORRILL NEAL.